W. H. GRIFFITH.
Corn and Cotton Planters.
No. 151,019.                                  Patented May 19, 1874.
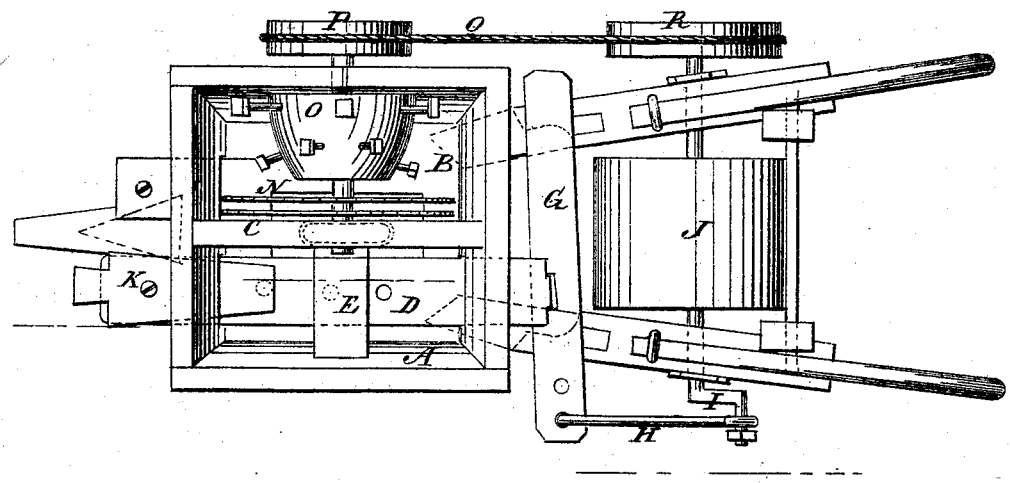
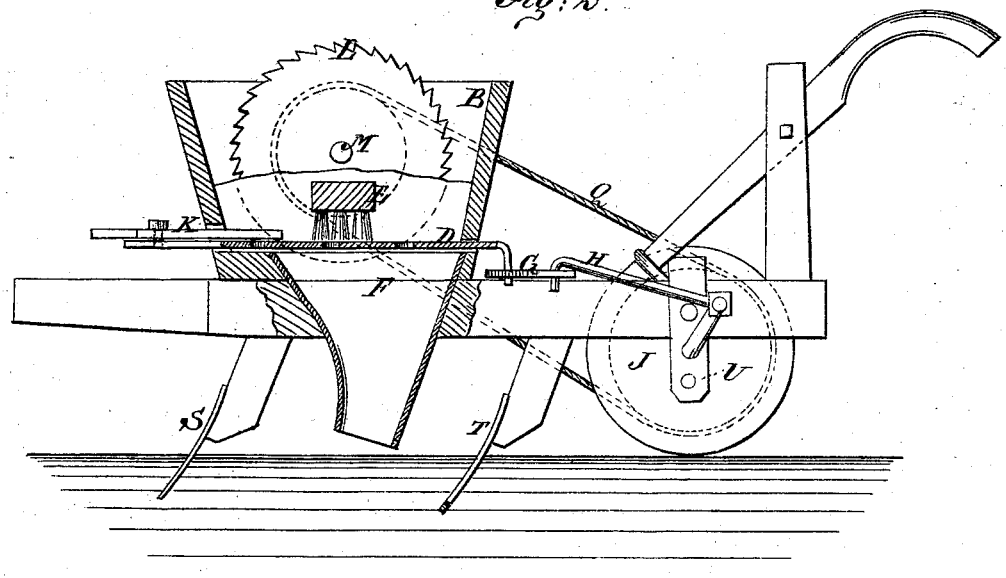
Witnesses:
Inventor:
W H Griffith
Per
Attorneys.

UNITED STATES PATENT OFFICE.

WILLIAM H. GRIFFITH, OF JONES' MILL, TEXAS, ASSIGNOR TO HIMSELF AND M. J. STRICKLAND, OF SAME PLACE.

IMPROVEMENT IN CORN AND COTTON PLANTERS.

Specification forming part of Letters Patent No. 151,019, dated May 19, 1874; application filed December 29, 1873.

*To all whom it may concern:*

Be it known that I, WILLIAM H. GRIFFITH, of Jones' Mill, in the county of Coryell and State of Texas, have invented a new and Improved Corn and Cotton Planter, of which the following is a specification:

The invention will first be fully described and then pointed out in the claim.

Figure 1 is a top view, and Fig. 2 is a longitudinal sectional elevation, of my improved planter.

Similar letters of reference indicate corresponding parts.

A is the corn part, and B the cotton part, of the hopper, which are separated by the partition C. In the cotton-hopper there are two saws, L, on a horizontal shaft, M, over and partly in the discharge-throat N, for forcing the cotton-seed through and preventing the throat from clogging. By the side of these saws is a spiked conical block, O, also on the shaft, to work the cotton-seed down to the saws. This shaft has a pulley, P, outside of the hopper, on which a belt, Q, works from a pulley, R, on the drum-shaft, to turn said shaft. S is the opening-plow, and T the covering-plows.

I am aware that saws and stirrers have been used upon the same shaft, and are no part of my invention.

Having thus described my invention, I claim as new and desire to secure by Letters Patent—

The combination, in a cotton-seed hopper, of the saws L L and spiked cone-block O, arranged on the same shaft, as and for the purpose described.

WILLIAM HARRISON GRIFFITH.

Witnesses:
H. C. GRIFFITH,
T. F. LAY.